(12) United States Patent
Higuchi et al.

(10) Patent No.: US 7,560,164 B2
(45) Date of Patent: Jul. 14, 2009

(54) SILICONE COATING COMPOSITIONS AND COATED ARTICLES

(75) Inventors: Koichi Higuchi, Gunma-ken (JP); Masaaki Yamaya, Gunma-ken (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 401 days.

(21) Appl. No.: 11/116,365

(22) Filed: Apr. 28, 2005

(65) Prior Publication Data

US 2005/0244659 A1    Nov. 3, 2005

(30) Foreign Application Priority Data

Apr. 30, 2004    (JP)    ............... 2004-136124

(51) Int. Cl.
*B32B 9/04*    (2006.01)
*C08L 83/00*   (2006.01)
*C07F 7/02*    (2006.01)

(52) U.S. Cl. .............. 428/447; 524/858; 106/287.12; 106/287.13; 106/287.14

(58) Field of Classification Search ........... 428/447; 542/863
See application file for complete search history.

(56) References Cited

U.S. PATENT DOCUMENTS

| | | | |
|---|---|---|---|
| 3,986,997 A | | 10/1976 | Clark |
| 4,159,206 A | | 6/1979 | Armbruster et al. |
| 4,170,690 A | | 10/1979 | Armbruster et al. |
| 4,371,585 A | | 2/1983 | Memon |
| 4,611,040 A | | 9/1986 | Olson et al. |
| 4,863,520 A | * | 9/1989 | Factor et al. ............ 106/287.12 |
| 4,914,143 A | * | 4/1990 | Patel ........................ 522/148 |
| 4,942,065 A | * | 7/1990 | Factor et al. ................ 427/387 |
| 4,990,376 A | * | 2/1991 | Patel ........................ 427/387 |
| 5,302,683 A | | 4/1994 | Weidner et al. |
| 5,633,311 A | * | 5/1997 | Yamamoto et al. ............ 528/14 |
| 5,844,060 A | * | 12/1998 | Furuya et al. ................ 528/30 |
| 6,548,614 B2 | * | 4/2003 | Mohri et al. .................. 528/14 |
| 6,787,191 B2 | * | 9/2004 | Hanahata et al. ............ 427/387 |
| 6,800,330 B2 | * | 10/2004 | Hayashi et al. ............. 427/387 |
| 6,846,567 B1 | * | 1/2005 | Ekinaka et al. ............. 428/447 |
| 7,081,272 B2 | * | 7/2006 | Sasaki et al. ................ 427/271 |
| 7,132,473 B2 | * | 11/2006 | Ogihara et al. ............. 524/588 |
| 2002/0020327 A1 | * | 2/2002 | Hayashi et al. ........ 106/287.12 |
| 2003/0236347 A1 | * | 12/2003 | Furuya et al. ............... 524/588 |
| 2005/0096415 A1 | * | 5/2005 | Akiyama et al. ............ 524/261 |
| 2005/0109238 A1 | * | 5/2005 | Yamaki et al. ......... 106/287.16 |

FOREIGN PATENT DOCUMENTS

| | | |
|---|---|---|
| EP | 0 512 418 A1 | 11/1992 |
| EP | 0 576 166 A2 | 12/1993 |
| EP | 1 146 092 A2 | 10/2001 |
| JP | 51-2736 U | 1/1976 |
| JP | 53-130732 U | 11/1978 |
| JP | 63-168470 A | 7/1988 |
| JP | 9-71654 A | 3/1997 |
| WO | WO 200046024 * | 1/2000 |
| WO | WO 200352003 * | 12/2002 |
| WO | WO-03035780 * | 5/2003 |

OTHER PUBLICATIONS

J. Org. Chem. 1980, 45, pp. 1164-1166.
J. Org. Chem. 1999, 64, pp. 7707-7716.

* cited by examiner

*Primary Examiner*—Randy Gulakowski
*Assistant Examiner*—Robert Loewe
(74) *Attorney, Agent, or Firm*—Birch, Stewart, Kolasch & Birch LLP

(57) ABSTRACT

A silicone coating composition comprising (A) a silicone resin resulting from (co)hydrolytic condensation of an alkoxysilane or a partial hydrolytic condensate thereof, (B) an aromatic-free compound for curing the silicone resin, and (C) a solvent remains stable during shelf storage. It is applied and heat cured to a plastic substrate to form a protective coat having a high hardness, mar resistance, adhesion, toughness and crack resistance.

8 Claims, No Drawings

SILICONE COATING COMPOSITIONS AND COATED ARTICLES

CROSS-REFERENCE TO RELATED APPLICATION

This non-provisional application claims priority under 35 U.S.C. §119(a) on Patent Application No. 2004-136124 filed in Japan on Apr. 30, 2004, the entire contents of which are hereby incorporated by reference.

TECHNICAL FIELD

This invention relates to silicone coating compositions and coated articles using the same. More particularly, it relates to silicone coating compositions which are improved in shelf stability and which are applied and heat cured to the surface of plastic substrates, typically organic resin substrates, to form coats having a high hardness and improved properties such as mar resistance, crack resistance and weathering resistance, and coated articles having cured coats of the silicone coating compositions on the surface of substrates.

BACKGROUND ART

Prior art coating compositions that form surface protective coats on the surface of plastic substrates, typically organic resin substrates, for imparting a high hardness and mar resistance thereto include coating compositions obtained through (partial) hydrolysis of hydrolyzable organosilanes and coating compositions further comprising colloidal silica.

For example, JP-A 51-2736, JP-A 53-130732 and JP-A 63-168470 disclose coating compositions comprising an organoalkoxysilane, a hydrolyzate and/or partial condensate thereof, and colloidal silica, the alkoxy groups being converted in the presence of excess water into silanol. Coats resulting from these coating compositions are suitable for the protection of underlying substrates due to a high hardness and good weathering resistance, but lack toughness. Coats having a thickness of 10 μm or more are likely to crack during heat curing, upon removal from the heat curing furnace, during outdoor service, or upon abrupt temperature changes. Although buffered basic catalysts are selected as the curing catalyst in light of shelf stability, these coating compositions suffer from a problem which arises from the fact that the hydrolyzate and/or condensate of alkoxysilane is based on relatively low molecular weight compounds. In these relatively low molecular weight compounds, silanols having a very high reactivity are contained in large amounts. Such silanols undergo condensation reaction slowly even at normal temperature so that they convert to higher molecular weights with the lapse of time, resulting in coats having lower hardness. Further, some compositions have the problem of stability that they can gel and be no longer used for the coating purpose.

For overcoming these drawbacks, JP-A 9-71654 discloses a siloxane resin composition comprising a relatively large amount of silanol, which composition is shelf stable and forms a coat having a high hardness and flexibility. This siloxane resin is prepared by hydrolyzing an alkoxysilane with water, the amount of water for hydrolysis being an excess amount relative to the alkoxysilane (specifically 100 to 5,000 parts by weight of water relative to 100 parts by weight of alkoxysilane), and distilling off the alcohol resulting from hydrolytic condensation at a relatively low temperature of 80° C. or lower, for thereby controlling the proportion in $RSiO_{3/2}$ units of those units having one silanol group represented by $RSiO_{2/2}(OH)$ wherein R is hydrogen or a substituted or unsubstituted, monovalent hydrocarbon group of 1 to 18 carbon atoms. Although the composition is improved in shelf stability, the use of excess water compromises the system efficiency and requires a complex removal step. The coat resulting from the composition is still insufficient in crack resistance and hardness. There is a need for further improvements in these factors.

With respect to the curing catalyst that finds a compromise between the high hardness of coats and the shelf stability of coating compositions, buffered basic compounds are often used, for example, alkali metal salts of carboxylic acids such as potassium formate, sodium acetate and potassium propionate; aminecarboxylates such as ammonium acetate, dimethylamine acetate, ethanolamine acetate, and dimethylaniline formate; and quaternary ammonium carboxylates, such as tetramethylammonium acetate, benzyltrimethylammonium acetate, and tetraethylammonium benzoate, as described in the above-cited patents. If non-buffered basic compounds including amines such as triethylamine, benzyltrimethylamine and pyridine, and alkali metal hydroxides and alkoxides such as sodium hydroxide and sodium methoxide are used, the resulting resins form coats which are susceptible to cracking despite a very high hardness, and are substantially low in shelf stability.

SUMMARY OF THE INVENTION

An object of the present invention is to provide silicone coating compositions which are fully shelf stable and can form coats having a high hardness, toughness, mar resistance, and adhesion, as well as minimized cracking even on rapid temperature changes; and coated articles having cured coats of the silicone compositions on the surface of substrates.

The inventors have discovered that a silicone coating composition comprising (A) a silicone resin resulting from (co) hydrolytic condensation of a specific alkoxysilane or a partial hydrolytic condensate thereof, (B) an aromatic group-free compound for curing the silicone resin, and (C) a solvent is fully shelf stable and can form coats having a high hardness, improved mar resistance, good adhesion, high toughness, and minimized cracking even on rapid temperature changes.

The present invention provides a silicone coating composition comprising (A) a silicone resin resulting from (co)hydrolytic condensation of at least one member selected from an alkoxysilane and a partial hydrolytic condensate thereof, the alkoxysilane having the general formula:

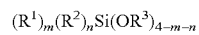

$(R^1)_m(R^2)_n Si(OR^3)_{4-m-n}$ wherein $R^1$ and $R^2$ are each independently hydrogen or a substituted or unsubstituted monovalent hydrocarbon group, $R^3$ is an alkyl group of 1 to 3 carbon atoms, m and n are each independently 0 or 1, and m+n is 0, 1 or 2, (B) an aromatic group-free compound for curing the silicone resin (A), the compound having the general formula:

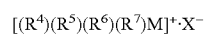

$[(R^4)(R^5)(R^6)(R^7)M]^+ \cdot X^-$ wherein $R^4$, $R^5$, $R^6$ and $R^7$ are each independently an alkyl group of 1 to 18 carbon atoms which may be substituted with halogen, each of $R^4$, $R^5$, $R^6$ and $R^7$ has a Taft-Dubois steric substituent constant Es, the total of constants Es of $R^4$, $R^5$, $R^6$ and $R^7$ is up to −0.5, M is a nitrogen or Phosphorus atom, and $X^-$ is a halide anion, hydroxide anion or carboxylate anion of 1 to 4 carbon atoms, and (C) a solvent.

The heat curable, silicone coating compositions of the invention eliminate coat cracking, offer a good balance between abrasion resistance and adhesion, and are improved in shelf stability. Coated articles having cured coats of the inventive silicone coating compositions are improved in mar resistance, crack resistance and weathering resistance.

DESCRIPTION OF THE PREFERRED EMBODIMENTS

One embodiment of the present invention is a silicone coating composition comprising (A) a silicone resin, (B) an aromatic group-free compound, and (C) a solvent.

Component A

Component (A) is a silicone resin resulting from (co)hydrolytic condensation of at least one member selected from an alkoxysilane having the following general formula (I) and a partial hydrolytic condensate thereof.

$$(R^1)_m(R^2)_n Si(OR^3)_{4-m-n} \quad (I)$$

Herein $R^1$ and $R^2$ are each independently hydrogen or a substituted or unsubstituted monovalent hydrocarbon group, $R^3$ is an alkyl group of 1 to 3 carbon atoms, m and n are each independently 0 or 1, and m+n is 0, 1 or 2.

In formula (I), $R^1$ and $R^2$ are each independently selected from hydrogen and substituted or unsubstituted monovalent hydrocarbon groups, for example, hydrogen; alkyl groups such as methyl, ethyl, propyl, butyl, pentyl, hexyl, heptyl and octyl; cycloalkyl groups such as cyclopentyl and cyclohexyl; alkenyl groups such as vinyl and allyl; aryl groups such as phenyl; halo-substituted hydrocarbon groups such as chloromethyl, γ-chloropropyl, and 3,3,3-trifluoropropyl; (meth)acryloxy, epoxy, mercapto, and amino-substituted hydrocarbon groups such as γ-methacryloxypropyl, γ-glycidoxypropyl, 3,4-epoxycyclohexylethyl, γ-mercaptopropyl, and γ-aminopropyl. Of these, alkyl groups are preferred for the applications where mar resistance and weather resistance are required; and epoxy or (meth)acryloxy-substituted hydrocarbon groups are preferred in the event requiring toughness and dyeability.

$R^3$ is selected from alkyl groups of 1 to 3 carbon atoms, for example, methyl, ethyl, n-propyl, and isopropyl. Of these, methyl and ethyl are preferred because of high reactivity for hydrolytic condensation and a high vapor pressure of the resulting alcohol $R^3 OH$, which is easy to distill off.

The alkoxysilane of formula (I) wherein m=0 and n=0 is (a-1) a tetraalkoxysilane of the formula: $Si(OR^3)_4$ or a partial hydrolytic condensate thereof. Examples of suitable tetraalkoxysilane and partial hydrolytic condensate thereof include tetramethoxysilane, tetraethoxysilane, tetraisopropoxysilane, tetrabutoxysilane; partial hydrolytic condensates of tetramethoxysilane, which are commercially available under the trade name of M Silicate 51 from Tama Chemicals Co., Ltd., MSI51 from Colcoat Co., Ltd., and MS51 and MS56 from Mitsubishi Chemical Co., Ltd.; partial hydrolytic condensates of tetraethoxysilane, which are commercially available under the trade name of Silicate 35 and Silicate 45 from Tama Chemicals Co., Ltd., ESI40 and ESI48 from Colcoat Co., Ltd.; and partial co-hydrolytic condensates of tetramethoxysilane and tetraethoxysilane, which are commercially available under the trade name of FR-3 from Tama Chemicals Co., Ltd. and EMSi48 from Colcoat Co., Ltd.

The alkoxysilane of formula (I) wherein m=1 and n=0, or m=0 and n=1 is (a-2) a trialkoxysilane of the formula: $R^1 Si(OR^3)_3$ or a partial hydrolytic condensate thereof. Examples of suitable trialkoxysilane and partial hydrolytic condensate thereof include hydrogentrimethoxysilane, hydrogentriethoxysilane, methyltrimethoxysilane, methyltriethoxysilane, methyltriisopropoxysilane, ethyltrimethoxysilane, ethyltriethoxysilane, ethyltriisopropoxysilane, propyltrimethoxysilane, propyltriethoxysilane, propyltriisopropoxysilane, phenyltrimethoxysilane, vinyltrimethoxysilane, allyltrimethoxysilane, γ-methacryloxypropyltrimethoxysilane, γ-methacryloxypropyltriethoxysilane, γ-acryloxypropyltrimethoxysilane, γ-glycidoxypropyltrimethoxysilane, γ-glycidoxypropyltriethoxysilane, β-(3,4-epoxycyclohexyl)ethyltrimethoxysilane, γ-chloropropyltrimethoxysilane, 3,3,3-trifluoropropyltrimethoxysilane, 3,3,3-trifluoropropyltriethoxysilane, perfluorooctylethyltrimethoxysilane, γ-mercaptopropyltrimethoxysilane, γ-aminopropyltrimethoxysilane, γ-aminopropyltriethoxysilane, N-(2-aminoethyl)aminopropyltrimethoxysilane; and partial hydrolytic condensates of methyltrimethoxysilane, which are commercially available as KC-89S and X-40-9220 from Shin-Etsu Chemical Co., Ltd.; and partial hydrolytic condensates of methyltrimethoxysilane and γ-glycidoxypropyltrimethoxysilane, which are commercially available as X-41-1056 from Shin-Etsu Chemical Co., Ltd.

The alkoxysilane of formula (I) wherein m=1 and n=1 is (a-3) a dialkoxysilane of the formula: $(R^1)(R^2)Si(OR^3)_2$ or a partial hydrolytic condensate thereof. Examples of suitable dialkoxysilane and partial hydrolytic condensate thereof include methylhydrogendimethoxysilane, methylhydrogendiethoxysilane, dimethyldimethoxysilane, dimethyldiethoxysilane, methylethyldimethoxysilane, diethyldimethoxysilane, diethyldiethoxysilane, methylpropyldimethoxysilane, methylpropyldiethoxysilane, diisopropyldimethoxysilane, phenylmethyldimethoxysilane, vinylmethyldimethoxysilane, γ-glycidoxypropylmethyldimethoxysilane, γ-glycidoxypropylmethyldiethoxysilane, β-(3,4-epoxycyclohexyl)ethylmethyldimethoxysilane, γ-methacryloxypropylmethyldimethoxysilane, γ-methacryloxypropylmethyldiethoxysilane, γ-mercaptopropylmethyldimethoxysilane, γ-aminopropylmethyldiethoxysilane, and N-(2-aminoethyl)aminopropylmethyldimethoxysilane.

The silicone resin (A) may be prepared from a mixture of components (a-1), (a-2) and (a-3) in any desired proportion. For improved shelf stability, mar resistance and crack resistance, it is preferred to use 1 to 50 Si mol % of (a-1), 50 to 99 Si mol % of (a-2) and 0 to 10 Si mol % of (a-3), based on the total of (a-1), (a-2) and (a-3) which is equal to 100 Si mol %. If the content of component (a-2) serving as a main component is less than 50 Si mol %, the resulting resin tends to be less curable due to a lower crosslinking density, resulting in a cured film having a lower hardness. If the content of component (a-1) is in excess of 50 Si mol %, the resulting resin may have a lower toughness due to a higher crosslinking density, with some difficulty to avoid cracking.

It is noted that the term "Si mol %" refers to a percent based on entire Si moles. By the Si mole for a monomer, it is meant that its molecular weight is 1 mole, and for a dimer, its average molecular weight divided by 2 is 1 mole.

The silicone resin (A) may be prepared through (co)hydrolytic condensation of a mixture of components (a-1), (a-2) and (a-3) in a well-known manner. Specifically, a mixture of alkoxysilanes or partial hydrolytic condensates thereof as components (a-1), (a-2) and (a-3) is first (co)hydrolyzed with water at pH 1 to 7, preferably pH 2 to 6, and more preferably pH 2 to 5. Use may be made of a dispersion of microparticulates of metal oxide in water such as silica sol. For adjustment to the desired pH range and promoted hydrolysis, there may be used as the catalyst organic or inorganic acids, for example, hydrogen fluoride, hydrochloric acid, nitric acid, formic acid, acetic acid, propionic acid, oxalic acid, citric acid, maleic acid, benzoic acid, malonic acid, glutaric acid, glycolic acid, methanesulfonic acid, and toluenesulfonic acid; solid acid catalysts in the form of cation exchange resins having carboxylic or sulfonic acid groups on their surface; and dispersions of metal oxide microparticulates in water such as acidic water-dispersed silica sol. During the hydrolysis, a dispersion of metal oxide microparticulates in water or an organic solvent such as silica sol may be co-present.

For the hydrolysis, the amount of water used may be from 20 parts by weight to 3,000 parts by weight per 100 parts by weight of the mixture of alkoxysilanes or partial hydrolytic condensates thereof as components (a-1), (a-2) and (a-3). If water is used in excess, the system efficiency becomes decreased and a final composition formulated from the resulting silicone resin becomes inefficient in application and drying due to the influence of residual water. For improving shelf stability, mar resistance and crack resistance, the amount of water is preferably from 50 parts to less than 100 parts by weight per 100 parts by weight of the alkoxysilane mixture. With less than 50 parts by weight of water, the resulting silicone resin may have a number average molecular weight, as measured by GPC with polystyrene standards, which is not built up to the optimum region to be described later. If the amount of water used is equal to or more than 100 parts by weight, the resulting silicone resin may become such that in the units of the formula: $R'SiO_{(3-p)/2}(OX)_p$ derived from component (a-2) (wherein R' is $R^1$ or $R^2$; X is hydrogen or $R^3$; $R^1$, $R^2$ and $R^3$ are as defined above; and p is an integer of 0 to 3), the proportion of units of the formula: $R'SiO_{3/2}$ (wherein R' is as defined above) does not reach the optimum range to be described later.

Hydrolysis can be performed by adding dropwise or pouring water to the alkoxysilanes or partial hydrolytic condensates thereof, or inversely, by adding dropwise or pouring the alkoxysilanes or partial hydrolytic condensates thereof to water. An organic solvent may be contained herein. However, the absence of organic solvent is preferred because of the tendency that the resulting silicone resin is reduced in number average molecular weight (measured by GPC with polystyrene standards) as the amount of an organic solvent contained increases.

The hydrolysis must be followed by condensation before the silicone resin of the invention can be obtained. Condensation may be continuously carried out subsequent to the hydrolysis while typically heating the liquid at a temperature from normal temperature to 100° C. Temperatures above 100° C. may cause the liquid to gel. Since an alcohol(s) is formed during hydrolysis, condensation can be promoted by distilling off the alcohol(s) under atmospheric or reduced pressure at a temperature of at least 80° C.

To promote the condensation, condensation catalysts such as basic compounds, acidic compounds or metal chelate compounds may be added. Prior to or during the condensation, an organic solvent may be added for the purpose of adjusting the progress of condensation and the concentration of the reaction solution. Alternatively, a dispersion of metal oxide microparticulates in water or an organic solvent such as silica sol may be added. In general, as condensation proceeds, silicone resins become higher in molecular weight and less soluble in water and the alcohol(s) formed. Thus, the organic solvent to be added should preferably be selected from more polar organic solvents have a boiling point of at least 80° C. in which silicone resins are effectively dissolvable. Examples of suitable organic solvents include alcohols such as isopropyl alcohol, n-butanol, isobutanol, t-butanol and diacetone alcohol; ketones such as methyl propyl ketone, diethylketone, methyl isobutyl ketone, cyclohexanone and diacetone alcohol; ethers such as dipropyl ether, dibutyl ether, anisole, dioxane, ethylene glycol monoethyl ether, ethylene glycol monobutyl ether, propylene glycol monomethyl ether, and propylene glycol monomethyl ether acetate; and esters such as propyl acetate, butyl acetate, and cyclohexyl acetate.

The silicone resin resulting from condensation should preferably have a number average molecular weight of at least 1,500, as measured by gel permeation chromatography (GPC) with polystyrene standards. The number average molecular weight (Mn) is more preferably in the range of 1,500 to 50,000, most preferably 2,000 to 20,000. With a molecular weight below the range, coats may become less tough and liable to cracking. With too high a molecular weight, coats tend to have a lower hardness and undergo resin phase separation, becoming whitened.

By performing condensation under the above-described conditions, the resulting silicone resin contains units of the formulae: $Si(OX)_rO_{(4-r)/2}$, $R'Si(OX)_pO_{(3-p)/2}$, and $(R^1)(R^2)Si(OX)_qO_{(2-q)/2}$ derived from components (a-1), (a-2), and (a-3), respectively. Herein, X is hydrogen or $R^3$; R' is $R^1$ or $R^2$; $R^1$, $R^2$ and $R^3$ are as defined above; r is an integer of 0 to 4, p is an integer of 0 to 3, and q is an integer of 0 to 2.

Illustrative examples of units of the formula: $Si(OX)_rO_{(4-r)/2}$ include:
  $Si(OX)_4$ for r=4,
  $Si(OX)_3O_{1/2}$ for r=3,
  $Si(OX)_2O_{2/2}$ for r=2,
  $Si(OX)O_{3/2}$ for r=1, and
  $SiO_{4/2}$ for r=0.

Illustrative examples of units of the formula: $R'Si(OX)_pO_{(3-p)/2}$ include:
  $R'Si(OX)_3$ for p=3,
  $R'Si(OX)_2O_{1/2}$ for p=2,
  $R'Si(OX)O_{2/2}$ for p=1, and
  $R'SiO_{3/2}$ for p=0.

Illustrative examples of units of the formula: $(R^1)(R^2)Si(OX)_qO_{(2-q)/2}$ include:
  $(R^1)(R^2)Si(OX)_2$ for q=2,
  $(R^1)(R^2)Si(OX)O_{1/2}$ for q=1, and
  $(R^1)(R^2)SiO_{2/2}$ for q=0.

In the preferred silicone resin (A), units of p=0, represented by the formula: $R'SiO_{3/2}$ account for 30 to 80 mol %, and the total of units of p=1, represented by the formula: $R'Si(OX)O_{2/2}$ and units of p=2, represented by the formula: $R'Si(OX)_2O_{1/2}$ accounts for 20 to 70 mol % of units of the, formula: $R'Si(OX)_pO_{(3-p)/2}$ derived from component (a-2), as analyzed by silicon nuclear magnetic resonance spectroscopy ($^{29}$Si-NMR).

Desirably, the units of the formula: $R'SiO_{3/2}$ account for 30 to 80 mol %, more preferably 35 to 75 mol % of the units of the formula: $R'Si(OX)_pO_{(3-p)/2}$ wherein R', X and p are as defined above. If the content of the units of $R'SiO_{3/2}$ is less than 30 mol %, coats may become less tough and likely to crack. In excess of 80 mol %, coats tend to have an insufficient hardness. Also desirably, the total of units of the formulae: $R'Si(OX)O_{2/2}$ and $R'Si(OX)_2O_{1/2}$ accounts for 20 to 70 mol %, more preferably 22 to 67 mol % of the units of the formula: $R'Si(OX)_pO_{(3-p)/2}$. If this total is less than 20 mol %, coats may have an insufficient hardness. In excess of 70 mol %, coats may become less tough and likely to crack.

It is noted that the analytical values of GPC and NMR are those of a reaction solution containing the silicone resin produced by the foregoing process, which has been filtered.

Component B

Component (B) is a compound free of an aromatic group on the molecule, having the following general formula. It functions to promote curing of the silicone resin (A) when a coat is formed from the silicone coating composition of the invention.

$$[(R^4)(R^5)(R^6)(R^7)M]^+ \cdot X^-$$

Herein $R^4$, $R^5$, $R^6$ and $R^7$ are each independently an alkyl group of 1 to 18 carbon atoms which may be substituted with halogen, each of $R^4$, $R^5$, $R^6$ and $R^7$ has a Taft-Dubois steric substituent constant Es, the total of constants Es of $R^4$, $R^5$, $R^6$ and $R^7$ is up to −0.5, M is a nitrogen or phosphorus atom, and X⁻ is a halide anion, hydroxide anion or carboxylate anion of 1 to 4 carbon atoms.

Taft-Dubois steric substituent constant Es is a rate of esterification reaction of a substituted carboxylic acid under acidic conditions relative to methyl group $CH_3$ and represented by the equation:

$$Es = \log(k/k0)$$

wherein k is a rate of acidic esterification reaction of a substituted carboxylic acid under specific conditions and k0 is a rate of acidic esterification reaction of methyl-substituted carboxylic acid under the same conditions. See J. Org. Chem., 45, 1164 (1980) and J. Org. Chem., 64, 7707 (1999).

In general, Taft-Dubois steric substituent constant Es is an index representing the steric bulkiness of a substituent. For example, the value of constant Es is 0.00 for methyl, −0.08 for ethyl, −0.31 for n-propyl, and −0.31 for n-butyl, indicating that the lower (or more negative) the Es, the more sterically bulky is the substituent.

In component (B), the total of constants Es of $R^4$, $R^5$, $R^6$ and $R^7$ should be equal to or more negative than −0.5. If the total of constants Es is above −0.5, a coating composition becomes low in shelf stability and forms a coat which can be cracked or whitened in a water-resistant test and loses adhesion, especially water-resistant adhesion and boiling adhesion. In the event the total of constants Es is above −0.5, for example, $R^4$, $R^5$, $R^6$ and $R^7$ are all methyl, a corresponding component (B) becomes higher in catalytic activity, but a coating composition comprising the same tends to lose shelf stability and a coat thereof becomes so hygroscopic as to develop defects in a water-resistant test.

In the above formula, $R^4$, $R^5$, $R^6$ and $R^7$ are alkyl groups of 1 to 18 carbon atoms, preferably 1 to 12 carbon atoms, which may be substituted with halogen, for example, alkyl groups such as methyl, ethyl, propyl, butyl, pentyl, hexyl, heptyl, and octyl; cycloalkyl groups such as cyclopentyl and cyclohexyl; and halo-alkyl groups such as chloromethyl, γ-chloropropyl and 3,3,3-trifluoropropyl.

M is a nitrogen or phosphorus atom, X⁻ is a halide anion, hydroxide anion or carboxylate anion of 1 to 4 carbon atoms, and preferably a hydroxide anion or acetate anion.

Illustrative examples of component (B) include, but are not limited to, hydroxides such as tetra-n-propylammonium hydroxide, tetra-n-butylammonium hydroxide, tetra-n-pentylammonium hydroxide, tetra-n-hexylammonium hydroxide, tetracyclohexylammonium hydroxide, tetrakis(trifluoromethyl)ammonium hydroxide, trimethylcyclohexylammonium hydroxide, trimethyl(trifluoromethyl)ammonium hydroxide, trimethyl-t-butylammonium hydroxide, tetra-n-propylphosphonium hydroxide, tetra-n-butylphosphonium hydroxide, tetra-n-pentylphosphonium hydroxide, tetra-n-hexylphosphonium hydroxide, tetracyclohexylphosphonium hydroxide, tetrakis(trifluoromethyl)phosphonium hydroxide, trimethylcyclohexylphosphonium hydroxide, trimethyl(trifluoromethyl)phosphonium hydroxide, and trimethyl-t-butylphosphonium hydroxide; salts of the foregoing hydroxides with halogenic acids and with carboxylic acids of 1 to 4 carbon atoms. Inter alia, tetrapropylammonium hydroxide, tetrapropylammonium acetate, tetrabutylammonium hydroxide, tetrabutylammonium acetate, tetrabutylphosphonium hydroxide, and tetrabutylphosphonium acetate are preferred. These may be used alone or in admixture.

Component (B) is compounded in an effective amount for curing the silicone resin (A). Though the amount is not critical, component (B) is preferably used in an amount of 0.0001 to 30% by weight, more preferably 0.001 to 10% by weight, based on the solids of the silicone resin (A). Less than 0.0001% by weight of component (B) may result in undercure and lower hardness. More than 30% by weight may result in a coat which is likely to crack and less water resistant.

Any of well-known curing catalysts other than component (B) may be used in combination with component (B) as long as it does not compromise the benefits of the invention. Exemplary catalysts include alkali metal salts of carboxylic acids such as potassium formate, sodium acetate and potassium propionate; amine carboxylates such as ammonium acetate, dimethylamine acetate, ethanolamine acetate and dimethylaniline formate; amines such as triethylamine, triethylenediamine, benzyltrimethylamine, pyridine, and γ-aminopropyltrimethoxysilane; alkali metal hydroxides and alkoxides such as sodium hydroxide and sodium methoxide; modified or potential amines such as dicyandiamide, 2-methylimidazole and 2-phenylimidazole; organic acids and acid anhydrides such as acetic acid, citric acid, maleic acid, phthalic acid, terephthalic acid, and pyromellitic acid; inorganic acids such as hydrochloric acid, nitric acid, sulfuric acid, methanesulfonic acid, toluenesulfonic acid, tungstic acid phosphide, and molybdic acid phosphide; and metal compounds such as aluminum triisopropoxide, titanium tetrabutoxide, triacetylacetone aluminum, dioctyltin dilaurate, and zinc octylate.

Component C

Component (C) is a solvent which is not particularly limited as long as components (A) and (B) are dissolvable therein. Water and relatively polar organic solvents are preferred. Examples of suitable organic solvents include alcohols such as methanol, ethanol, isopropyl alcohol, n-butanol, isobutanol, t-butanol and diacetone alcohol; ketones such as methyl propyl ketone, diethyl ketone, methyl isobutyl ketone, cyclohexanone and diacetone alcohol; ethers such as dipropyl ether, dibutyl ether, anisole, dioxane, ethylene glycol monoethyl ether, ethylene glycol monobutyl ether, propylene glycol monomethyl ether, propylene glycol monomethyl ether acetate; and esters such as ethyl acetate, propyl acetate, butyl acetate, and cyclohexyl acetate. These solvents may be used alone or in admixture of two or more.

The solvent is preferably used in such amounts that the silicone coating composition may have a solids concentration of 1 to 30% by weight, especially 5 to 25% by weight. Outside the range, some coats resulting from the coating and curing of the composition become defective. Specifically, below the range, coats tend to become sagged, twisted or mottled, failing to provide the desired hardness and mar resistance. Beyond the range, coats are susceptible to blushing or whitening and cracking.

To the silicone coating composition of the invention, pH modifiers, leveling agents, thickeners, pigments, dyes, microparticulate metal oxides, metal powders, antioxidants, UV absorbers, UV stabilizers, IR reflecting/absorbing agents, flexibilizers, antistatic agents, anti-fouling agents, water repellents or the like may be added, if necessary, and as long as they do not compromise the benefits of the invention.

Specifically, for rendering the silicone coating composition of the invention more stable during storage, the liquid is preferably maintained at pH 2 to 7, more preferably pH 3 to 6. Since shelf stability can be substantially degraded at pH outside the range, a pH modifier may be added for adjusting the pH to the above range. Where the pH of the silicone coating composition is more acidic outside the range, a basic compound such as ammonia or ethylene diamine may be added for pH adjustment. Where the pH of the silicone coating composition is more basic outside the range, an acidic compound such as hydrochloric acid, nitric acid, acetic acid or citric acid may be added for pH adjustment. However, the pH adjusting technique is not limited to these.

For the purpose of improving the hardness and mar resistance of cured coats obtained by coating and curing the silicone coating composition of the invention and for imparting thereto additional functions such as a higher refractive index, UV barrier, antistatic, IR reflection and absorption, there may be added microparticulate metal oxides, metal chelate compounds of titanium, zinc, zirconium or the like, and (partial) hydrolyzates and condensates thereof. For the microparticulate metal oxides, the shape and size of particles are not particularly limited although a smaller particle size is better for forming more transparent coats. Examples of microparticulate metal oxides include, but are not limited to, silica, alumina, titania, ceria, tin oxide, zirconia, antimony oxide, indium oxide, iron oxide, titania doped with iron oxide and/or zirconia, rare earth oxides, and mixtures and complex oxides thereof. Colloidal dispersions of such microparticulate metal oxides may also be used. Alternatively, metal oxides in powder form may be dispersed in the silicone coating compositions. The amount of microparticulate metal oxide added is preferably 0.1 to 300% by weight based on the solids in the silicone coating composition.

When the silicone coating composition of the invention is applied and cured to substrates of organic resins or wood to form cured coats thereon, a UV absorber and/or UV stabilizer may be added to the composition for the purpose of preventing the substrate from yellowing and surface deterioration. Those UV absorbers and UV stabilizers which are compatible with the silicone coating composition of the invention and less volatile are preferred.

Examples of UV absorbers include inorganic absorbers, for example, microparticulate oxides of the type described above such as titanium oxide, cerium oxide and zirconium oxide, metal chelate compounds of titanium, zinc, zirconium and the like, and (partial) hydrolyzates and condensates thereof. Preferred organic UV absorbers are derivatives of hydroxybenzophenone, benzotriazole, cyanoacrylate and triazine backbone compounds. Also included are vinyl and other polymers having such UV absorbers incorporated on side chains and copolymers thereof with other vinyl monomers, and silyl-modified UV absorbers and (partial) hydrolytic condensates thereof. Examples include 2,4-dihydroxybenzophenone, 2,2',4,4'-tetrahydroxybenzophenone, 2-hydroxy-4-methoxybenzophenone, 2-hydroxy-4-methoxybenzophenone-5-sulfonic acid, 2-hydroxy-4-n-octoxybenzophenone, 2-hydroxy-4-n-dodecyloxybenzophenone, 2-hydroxy-4-n-benzyloxybenzophenone, 2,2'-dihydroxy-4,4'-dimethoxybenzophenone, 2,2'-dihydroxy-4,4'-diethoxybenzophenone, 2,2'-dihydroxy-4,4'-dipropoxybenzophenone, 2,2'-dihydroxy-4,4'-dibutoxybenzophenone, 2,2'-dihydroxy-4-methoxy-4'-propoxybenzophenone, 2,2'-dihydroxy-4-methoxy-4'-butoxybenzophenone, 2,3,4-trihydroxybenzophenone, 2-(2-hydroxy-5-t-methylphenyl)benzotriazole, 2-(2-hydroxy-5-t-octylphenyl)benzotriazole, 2-(2-hydroxy-3,5-di-t-butylphenyl)benzotriazole, ethyl 2-cyano-3,3-diphenylacrylate, 2-ethylhexyl 2-cyano-3,3-diphenylacrylate, 2-(2-hydroxy-4-hexyloxyphenyl)-4,6-diphenyltriazine, (co)polymers of 2-hydroxy-4-(2-acryloxyethoxy)benzophenone, (co)polymers of 2-(2'-hydroxy-5'-methacryloxyethylphenyl)-2H-benzotriazole, the reaction product of 2,4-dihydroxybenzophenone with γ-glycidoxypropyltrimethoxysilane, the reaction product of 2,2',4,4'-tetrahydroxybenzophenone with γ-glycidoxypropyltrimethoxysilane, and (partial) hydrolyzates thereof. These organic UV absorbers may be used in admixture of two or more. Preferably, these UV absorbers are compounded in amounts of 0.1 to 100% by weight based on the solids in the silicone coating composition.

Preferred UV stabilizers are low volatile compounds which have at least one cyclic hindered amine structure within a molecule and are compatible with the silicone coating composition of the invention. Examples include 3-dodecyl-1-(2,2,6,6-tetramethyl-4-piperidinyl)pyrrolidine-2,5-dione, N-methyl-3-dodecyl-1-(2,2,6,6-tetramethyl-4-piperidinyl)-pyrrolidine-2,5-dione, N-acetyl-3-dodecyl-1-(2,2,6,6-tetramethyl-4-piperidinyl)-pyrrolidine-2,5-dione, bis(2,2,6,6-tetramethyl-4-piperidyl)sebacate, bis(1,2,2,6,6-pentamethyl-4-piperidyl)sebacate, tetrakis(2,2,6,6-tetramethyl-4-piperidyl)1,2,3,4-butanetetracarboxylate, tetrakis(1,2,2,6,6-pentamethyl-4-piperidyl)1,2,3,4-butanetetracarboxylate, condensates of 1,2,3,4-butanetetracarboxylic acid with 2,2,6,6-tetramethyl-piperidinol and tridecanol, 8-acetyl-3-dodecyl-7,7,9,9-tetramethyl-1,3,8-trisazaspiro-[4,5]decane-2,4-dione, condensates of 1,2,3,4-butanetetracarboxylic acid with 1,2,6,6-pentamethyl-4-piperidinol and β,β,β,β'-tetramethyl-3,9-(2,4,8,10-tetraoxaspiro[5,5]undecane)diethanol, and condensates of 1,2,3,4-butanetetracarboxylic acid with 2,2,6,6-pentamethyl-4-piperidinol and β,β,β,β'-tetramethyl-3,9-(2,4,8,10-tetraoxaspiro[5,5]undecane)diethanol. Also useful for the purpose of fixing the UV stabilizer are silyl-modified photostabilizers as described in JP-B 61-56187, for example, 2,2,6,6-tetramethylpiperidino-4-propyltrimethoxysilane, 2,2,6,6-tetramethylpiperidino-4-propylmethyldimethoxysilane, 2,2,6,6-tetramethylpiperidino-4-propyltriethoxysilane, 2,2,6,6-tetramethylpiperidino-4-propylmethyldiethoxysilane, and (partial) hydrolyzates thereof. These UV stabilizers may be used in admixture of two or more. Preferably, these UV stabilizers are compounded in amounts of 0.01 to 10% by weight based on the solids in the silicone coating composition.

The silicone coating composition of the invention is prepared by mixing predetermined amounts of the foregoing components in a conventional manner.

The silicone coating composition thus obtained is applied and cured to at least one surface of a substrate directly or via at least one layer of different type, yielding a coated article.

The silicone coating composition of the invention may be applied to a substrate by any conventional coating technique. A suitable coating technique may be selected from among, for example, brush coating, spraying, dipping, flow coating, roll coating, curtain coating, spin coating, and knife coating.

The substrates used herein include molded plastics, wood, ceramics, glass, metals and composites thereof and are not limited thereto. Advantageously, the silicone coating compositions of the invention are applied to substrates of various plastics or organic resins, typically polycarbonates, polystyrene, acrylic resins, modified acrylic resins, urethane resins, thiourethane resins, polycondensates of halogenated bisphenol A with ethylene glycol, acrylic urethane resins, halogenated aryl-containing acrylic resins, and sulfur-containing resins. Also included are these resin substrates whose surface has been treated, for example, by chemical treatment, corona discharge treatment, plasma treatment, or treatment with acid or alkaline liquid, as well as laminates of a substrate of a certain resin and a surface layer of a different resin. Exemplary laminates include laminates comprising a polycarbonate resin substrate and a surface layer of acrylic resin or urethane resin, and laminates comprising a polyester resin substrate and a surface layer of acrylic resin, which are manufactured by a co-extrusion or laminating technique.

A cured coat of the silicone coating composition of the invention can be formed on the surface of a resin substrate directly or through an intervening layer if necessary. Such an intervening layer is selected from among a primer layer, UV-absorbing layer, printing layer, recording layer, thermal barrier layer, adhesive layer, inorganic evaporated film layer, etc.

Once the silicone coating composition of the invention is coated, it may be cured either by holding in air for drying or by heating. Although the curing temperature and time are not critical, the coating is heated preferably at a temperature below the heat resistant temperature of the substrate for 10 minutes to 2 hours. Specifically, heating at 80 to 135° C. for 30 minutes to 2 hours is preferred.

The thickness of coats is not particularly limited and is typically in the range of 0.1 to 50 μm. Coats having a thickness of 1 to 20 μm are preferred because they meet the desired hardness, mar resistance, long-lasting adhesion and crack-arresting property.

EXAMPLE

Examples and Comparative Examples are given below for further illustrating the invention, but the invention is not limited thereto. All % are by weight unless otherwise stated.

[Preparation of Silicone Resin A]

Preparation Example 1

A 2-liter flask was charged with 339 g (2.49 Si moles) of methyltrimethoxysilane and 56 g (0.33 Si mole) of Silicate 35 (trade name, by Tama Chemicals Co., Ltd., partial hydrolytic condensate of tetraethoxysilane, average dimer), which were thoroughly admixed. The liquid was cooled to about 10° C., after which 308 g of 0.25 N acetic acid aqueous solution was added dropwise for effecting hydrolysis while cooling so that the internal temperature did not exceed 40° C. At the end of dropwise addition, the reaction solution was stirred below 40° C. for one hour and then at 60° C. for 3 hours for driving hydrolysis to completion.

Thereafter, 300 g of cyclohexanone was admitted to the reaction solution, from which methanol and ethanol resulting from hydrolysis were distilled off under atmospheric pressure until the liquid temperature reached 95° C. Then 470 g of t-butanol as a diluent and 0.05 g of KP-341 (Shin-Etsu Chemical Co., Ltd.) as a leveling agent were added to the residue. Filtration through a paper filter yielded a colorless clear silicone resin solution A having a nonvolatile concentration of 19.5%.

Preparation Example 2

A 2-liter flask was charged with 184 g (1.35 Si moles) of methyltrimethoxysilane, 33 g (0.15 Si mole) of 3,3,3-trifluoropropyltrimethoxysilane, 160 g (1.05 Si moles) of tetramethoxysilane and 36 g (0.30 Si mole) of dimethyldimethoxysilane, which were thoroughly admixed. The liquid was cooled to about 10° C., after which 321 g of 0.05 N hydrochloric acid aqueous solution was added dropwise for effecting hydrolysis while cooling so that the internal temperature did not exceed 40° C. At the end of dropwise addition, the reaction solution was stirred below 40° C. for one hour and then at 60° C. for 3 hours for driving hydrolysis to completion.

Thereafter, 300 g of propylene glycol monomethyl ether acetate was admitted to the reaction solution, from which methanol and ethanol resulting from hydrolysis were distilled off under atmospheric pressure until the liquid temperature reached 110° C. Then 470 g of isopropanol as a diluent and 0.05 g of KP-341 (Shin-Etsu Chemical Co., Ltd.) as a leveling agent were added to the residue. Filtration through a paper filter yielded a colorless clear silicone resin solution B having a nonvolatile concentration of 18.4%.

Preparation Example 3

A 2-liter flask was charged with 232 g (2.29 Si moles) of KC-89S (trade name, by Shin-Etsu Chemical Co., Ltd., partial hydrolytic condensate of methyltrimethoxysilane, average tetramer). The liquid was cooled to about 10° C., after which 230 g of 0.25 N acetic acid aqueous solution was added dropwise for effecting hydrolysis while cooling so that the internal temperature did not exceed 40° C. At the end of dropwise addition, the reaction solution was stirred below 40° C. for one hour and then at 60° C. for 6 hours for driving hydrolysis to completion.

Thereafter, 100 g of methyl isobutyl ketone, 350 g of isopropanol and 0.05 g of KP-341 (Shin-Etsu Chemical Co., Ltd.) as a leveling agent were added to the reaction solution. Filtration through a paper filter yielded a colorless clear silicone resin solution C having a nonvolatile concentration of 19.4%.

Preparation Example 4

A 2-liter flask was charged with 600 g (3.37 Si moles) of methyltriethoxysilane, 168 g of isobutanol and 0.4 g of acetic acid. The liquid was cooled to about 10° C., after which 372 g of water-dispersed silica sol "Snowtex O" (Nissan Chemical Industries, Ltd.) was added. Hydrolysis was effected below 10° C. for 3 hours. Thereafter, 105 g of isobutanol-dispersed silica sol "IBA-ST-20" (Nissan Chemical Industries, Ltd.) and 29 g of isobutanol were added to the solution, which was stirred at room temperature for 16 hours and then at 60° C. for 4 hours for driving hydrolysis to completion.

Thereafter, 43 g of ethanol, 67 g of isopropanol, 217 g of propylene glycol monomethyl ether, and 170 g of isobutanol as diluents and 0.7 g of KP-341 (Shin-Etsu Chemical Co., Ltd.) as a leveling agent were added to the reaction solution. Thorough agitation and filtration through a paper filter yielded a colorless translucent silicone resin solution D having a nonvolatile concentration of 19.7%.

The silicone resin solutions obtained above were analyzed by gel permeation chromatography (GPC) using polystyrene standards and silicon nuclear magnetic resonance spectroscopy ($^{29}$Si-NMR), with the results being shown in Tables 1 and 2.

TABLE 1

Unit contents and results of GPC analysis

| Example | Solution | $SiO_{(4-r)/2}(OX)_r$ units (mol %) | $R^1SiO_{(3-p)/2}(OX)_p$ units (mol %) | $(R^2)_2SiO_{(2-q)/2}(OX)_q$ units (mol %) | Mn | Dispersity |
|---|---|---|---|---|---|---|
| Preparation Example 1 | Solution A | 12 | 88 | — | 3050 | 2.8 |
| Preparation Example 2 | Solution B | 37 | 53 | 10 | 5500 | 5.8 |
| Preparation Example 3 | Solution C | — | 100 | — | 2950 | 2.2 |
| Preparation Example 4 | Solution D | 33 | 67 | — | 600 | 1.3 |

It is noted that Mn is a number average molecular weight, Mw is a weight average molecular weight, and dispersity is a molecular weight distribution Mw/Mn.

$SiO_{(4-r)/2}(OX)_r$ units: units derived from tetraalkoxysilane and partial hydrolytic condensate thereof or silica sol wherein X is H or $R^3$ which is $C_1$-$C_3$ alkyl, and r is an integer of 0-4.

$R^1SiO_{(3-p)/2}(OX)_p$ units: units derived from trialkoxysilane and partial hydrolytic condensate thereof wherein $R^1$ is H or a substituted or unsubstituted monovalent hydrocarbon group, X is as defined above, and p is an integer of 0-3.

$(R^2)_2SiO_{(2-q)/2}(OX)_q$ units: units derived from dialkoxysilane and partial hydrolytic condensate thereof wherein $R^2$ is H or a substituted or unsubstituted monovalent hydrocarbon group, X is as defined above, and q is an integer of 0-2.

TABLE 2 results of $^{29}$Si-NMR analysis

| | | in $R^1SiO_{(3-p)/2}(OX)_p$ units | | | in $SiO_{(4-r)/2}(OX)_r$ units | | |
|---|---|---|---|---|---|---|---|
| Example | Solution | $R^1SiO_{3/2}$ unit content (%) | $R^1SiO_{2/2}(OX)$ unit content (%) | $R^1SiO_{1/2}(OX)_2$ unit content (%) | $SiO_{4/2}$ unit content (%) | $SiO_{3/2}(OX)$ unit content (%) | $SiO_{2/2}(OX)_2$ unit content (%) |
| Preparation Example 1 | Solution A | 42.5 | 52.0 | 5.5 | 74.6 | 17.4 | 8.0 |
| Preparation Example 2 | Solution B | 72.3 | 25.8 | 1.9 | 62.6 | 30.5 | 6.9 |
| Preparation Example 3 | Solution C | 39.8 | 52.7 | 7.5 | — | — | — |
| Preparation Example 4 | Solution D | 28.6 | 57.7 | 13.7 | 100.0 | — | — |

Note that the content of $R^1Si(OX)_3$ units in $R^1SiO_{(3-p)/2}(OX)_p$ units was below the detection limit; and that both the contents of $SiO_{1/2}(OX)_3$ units and $Si(OX)_4$ units in $SiO_{(4-r)/2}(OX)_r$ units were below the detection limit.

[Tests on Cured Coats of Silicone Coating Compositions]

Example 1

Silicone resin solution A obtained in Preparation Example 1 was diluted with isopropanol to a nonvolatile concentration of 18%. A 0.25% aqueous solution of tetrabutylammonium hydroxide (TBAH) was then added as a curing catalyst in an amount of 2% based on the solids in the silicone resin solution, yielding a coating composition #1. This coating composition was applied to the acrylic resin side of a polycarbonate/acrylic resin co-extruded plate (300 mm long, 200 mm wide, 0.5 mm thick) by a flow coating technique. It was cured by heating at 130° C. for one hour. The cured coat was examined by the tests described later, with the results shown in Table 3.

Examples 2-6 and Comparative Examples 1-3

Each of Silicone resin solutions A to D obtained in Preparation Examples 1 to 4 was diluted with isopropanol to a nonvolatile concentration of 18%. Then a solution of compound (B) as a curing catalyst was added in the amount shown in Table 3. In this way, a series of coating compositions were prepared. In some compositions, additives (including microparticulate metal oxides, UV absorbers, light stabilizer and flexibilizer) as shown below were added in the amounts shown in Table 3. They are designated coating compositions #2 to #9.

Each coating composition was applied to the acrylic resin side of a polycarbonate/acrylic resin co-extruded plate (300 mm long, 200 mm wide, 0.5 mm thick) by a flow coating technique. It was cured by heating at 130° C. for one hour. The cured coat was examined by the tests described later, with the results shown in Table 3.

Compound (B):

TBAH: 0.25% aqueous solution of tetrabutylammonium hydroxide, total Es=−1.24 (Examples 1 and 2)

TBPH: 0.25% aqueous solution of tetra-n-butylphosphonium hydroxide, total Es=−1.24 (Example 3)

TPAH: 0.25% aqueous solution of tetra-n-propylammonium hydroxide, total Es=−1.24 (Example 4)

TBPBr: 0.25% aqueous solution of tetra-n-butylphosphonium bromide, total Es=−1.24 (Example 5)

TBAAc: 0.25% aqueous solution of tetra-n-butylammonium acetate, total Es=−1.24 (Example 6)

BTMAAc: 0.25% aqueous solution of benzyltrimethylammonium acetate, total Es=−0.39, containing aromatic group (Comparative Example 1)

TMAH: 0.25% aqueous solution of tetramethylammonium hydroxide, total Es=−0.00 (Comparative Example 2)

TEAH: 0.25% aqueous solution of tetraethylammonium hydroxide, total Es=−0.32 (Comparative Example 3)

Microparticulate Metal Oxides:

Particle I: 30% isopropanol dispersion of silica sol (IPA-ST, by Nissan Chemical Industries Ltd.)

Particle II: 20% methanol dispersion of titanium oxide-containing complex metal oxide sol (1120Z, by Catalyst & Chemicals Ind. Co., Ltd.)

UV Absorbers:

UVA-I: 50% 1-methoxy-2-propanol solution of a copolymer of 30% 2-(2'-hydroxy-5'-methacryloxyethylphenyl)-2H-benzotriazole and 70% methyl methacrylate (PUVA-NW, by Otsuka Chemical Co., Ltd.)

UWA-II: 2-[4-[(2-hydroxy-3-dodecyl/tridecyl-oxypropyl)oxy]-2-hydroxyphenyl]-4,6-bis(2,4-dimethylphenyl)-1,3,5-triazine (Tinuvin 400, by Ciba Specialty Chemicals)

Hindered amine Light Stabilizer:

HALS-I: N-acetyl-3-dodecyl-1-(2,2,6,6-tetramethyl-4-piperidinyl)pirrolidine-2,5-dione (Sandbar 3058Liq., Clariant)

Flexibilizer:

Flexibilizer I: 25% isobutanol solution of polymethylsiloxane (KR-220L, by Shin-Etsu Chemical Co., Ltd.)

Tests on Cured Coats:

Coat Appearance

The coat was visually observed to find any defects.

Mar Resistance

The test was carried out according to ASTM 1044 using a Taber abrader equipped with an abrasive wheel CS-10F under a load of 500 g. After 500 revolutions, the sample was measured for haze. A difference in haze before and after the test is reported as an index of mar resistance.

Adhesion

According to JIS K5400, a coat was incised with a razor blade at intervals of 2 mm in orthogonal directions to form six incisions in each direction to define 25 square sections. Once a pressure-sensitive adhesive tape, Cellotape® (Nichiban Co., Ltd.) was attached closely to the coat, it was rapidly peeled back at an angle of 90°. The number (X) of remaining coat sections is reported as X/25.

Water Resistance

A sample was immersed in boiling water for 2 hours, after which any change of appearance and adhesion were examined.

Heat Resistance

A sample was heated in a hot air circulating drier at 130° C. for one hour, after which it was visually observed to find any cracks.

Shelf Stability

After a coating composition was aged at 40° C. for 2 weeks, its number average molecular weight Mn was determined by GPC. The composition was rated "OK" when the Mn of the aged sample increased by less than 15% from the initial Mn, and "NG" when the aged Mn increased by at least 15% from the initial Mn.

TABLE 3

Results of coat performance evaluation

| Coating composition | Silicone resin solution | Curing catalyst (%/resin) solution) | Additive (%/resin) solution) | Coat appearance | Mar resistance | Water resistance (appearance) | Water resistance (adhesion) | Heat resistance | Shelf stability |
|---|---|---|---|---|---|---|---|---|---|
| #1 (EX1) | A (Preparation Example 1) | TBAH (2%) | none | sound | 6 | sound | 25/25 | sound | OK |
| #2 (EX2) | A (Preparation Example 1) | TBAH (3%) | Particle I 5% | sound | 8 | sound | 25/25 | sound | OK |
| #3 (EX3) | B (Preparation Example 2) | TBPH (3%) | UVA-I 4% | sound | 7 | sound | 25/25 | sound | OK |
| #4 (EX4) | C (Preparation Example 3) | TPAH (3%) | UVA-II 0.5% + HALS-I 0.1% | sound | 9 | sound | 25/25 | sound | OK |
| #5 (EX5) | D (Preparation Example 4) | TBPBr (4%) | Flexibilizer I 10% | sound | 7 | sound | 25/25 | sound | OK |
| #6 (EX6) | A (Preparation Example 1) | TBAAc (3%) | Particle II 1% | sound | 11 | sound | 25/25 | sound | OK |
| #7 (CE1) | A (Preparation Example 1) | BTMAAc (2%) | none | sound | 7 | sound | 0/25 | sound | OK |
| #8 (CE2) | A (Preparation Example 1) | TMAH (2%) | none | cracked | 3 | slightly whitened | 20/25 | more cracked | OK |
| #9 (CE3) | D (Preparation Example 4) | TEAH (2%) | UVA-II 0.5% | cracked | 2 | more cracked | 0/25 | more cracked | NG |

Note that "%/resin solution" refers to an amount of curing catalyst or additive based on the solids in the silicone resin solution.

Example 7

A primer was prepared by compounding an acrylic primer, Primer PC-7A (Shin-Etsu Chemical Co., Ltd.) with a 20% 1-methoxy-2-propanol solution of a UV absorber (PUVA-30M by Otsuka Chemical Co., Ltd., a copolymer of 30% 2-(2'-hydroxy-5'-methacryloxyethylphenyl)-2H-benzotriazole and 70% methyl methacrylate) in such amounts that the solids of UV absorber was 20% relative to the solids of Primer PC-7A. This primer was previously coated to a polycarbonate resin plate (300 mm long, 200 mm wide, 0.5 mm thick) by flow coating and curing at 130° C. for 30 minutes. To the primed plate, each of coating compositions #1, #3, #4, #6 prepared in Examples 1, 3, 4, 6 and compositions #8 and #9 of Comparative Examples 2 and 3 was coated by flow coating, followed by curing at 130° C. for one hour. The resulting coats were evaluated by the same tests as above, with the results being shown in Table 4.

Example 8

The coat obtained in Example 7 was evaluated by a weathering test, with the results being shown in Table 5.

Weathering Test

Using Eyesuper UV tester W-151 (Iwasaki Electric Co., Ltd.), a weathering test was carried out over 100 hours and 250 hours by repeating cycles consisting of [black panel temperature 63° C., humidity 50% RH, illuminance 50 mW/cm$^2$, raining intervals of 10 sec/hour for 5 hours] and [black panel temperature 30° C., humidity 95% RH for one hour]. Before and after the weathering test, the sample was determined for yellowing factor according to JIS K7103. The weathered coat was also examined for cracks and separation with naked eyes or under a microscope (250× magnifying power).

Weathering Crack Resistance of Coat

The coat after the weathering test was rated according to the following criterion.
○: sound
Δ: some cracks
X: cracks on entire coat Weathering Separation Resistance of Coat The coat after the weathering test was rated according to the following criterion.
○: sound
X: separation between a cured coat of silicone resin composition and a cured primer coat

TABLE 4

Results of coat performance evaluation

| Coating composition | Silicone resin solution | Curing catalyst (%/resin) solution) | Additive (%/resin solution) | Coat appearance | Mar resistance | Water resistance (appearance) | Water resistance (adhesion) | Heat resistance | Shelf stability |
|---|---|---|---|---|---|---|---|---|---|
| #1 (EX1) | A (Preparation Example 1) | TBAH (2%) | none | sound | 7 | sound | 25/25 | sound | OK |
| #3 (EX3) | B (Preparation Example 2) | TBPH (3%) | UVA-I 4% | sound | 7 | sound | 25/25 | sound | OK |
| #4 (EX4) | C (Preparation Example 3) | TPAH (3%) | UVA-II 0.5% + HALS-I 0.1% | sound | 10 | sound | 25/25 | sound | OK |
| #6 (EX6) | A (Preparation Example 1) | TBAAc (3%) | Particle II 1% | sound | 9 | sound | 25/25 | sound | OK |
| #8 (CE2) | A (Preparation Example 1) | TMAH (2%) | none | sound | 2 | slightly whitened, cracked | 25/25 | cracked | OK |
| #9 (CE3) | D (Preparation Example 4) | TEAH (2%) | UVA-II 0.5% | sound | 2 | cracked | 25/25 | cracked | NG |

TABLE 5

Results of weathering test

| Coating composition | 100 hr weathering test | | | 250 hr weathering test | | |
|---|---|---|---|---|---|---|
| | Yellowing factor | Crack resistance | Separation | Yellowing factor | Crack resistance | Separation |
| #1 (EX1) | 1 | ○ | ○ | 3 | ○ | ○ |
| #3 (EX3) | <1 | ○ | ○ | <1 | ○ | ○ |
| #4 (EX4) | <1 | ○ | ○ | 1 | ○ | ○ |
| #6 (EX6) | <1 | ○ | ○ | 1 | ○ | ○ |
| #8 (CE2) | 1 | ○ | ○ | 4 | X | X |
| #9 (CE3) | <1 | Δ | ○ | 5 | X | X |

Japanese Patent Application No. 2004-136124 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. A silicone coating composition consisting of:
   (A) a silicone resin resulting from (co)hydrolytic condensation of at least one member selected from an alkoxysilane and a partial hydrolytic condensate thereof, the alkoxysilane having the general formula:

$$(R^1)_m(R^2)_n Si(OR^3)_{4-m-n}$$

wherein $R^1$ and $R^2$ are each independently hydrogen or a substituted or unsubstituted monovalent hydrocarbon group, $R^3$ is an alkyl group of 1 to 3 carbon atoms, m and n are each independently 0 or 1, and m+n is 0, 1 or 2,
   (B) an aromatic group-free compound for curing the silicone resin (A), the compound having the general formula:

$$[(R^4)(R^5)(R^6)(R^7)M]^+ \cdot X^-$$

wherein $R^4$, $R^5$, $R^6$ and $R^7$ are each independently an alkyl group of 1 to 18 carbon atoms which may be substituted with halogen, each of $R^4$, $R^5$, $R^6$ and $R^7$ has a Taft-Dubois steric substituent constant Es, the total of constants Es of $R^4$, $R^5$, $R^6$ and $R^7$ is up to −0.5, M is a nitrogen or phosphorus atom, and $X^-$ is a hydroxide anion or carboxylate anion of 1 to 4 carbon atoms, and
   (C) a solvent selected from the group consisting of methanol, ethanol, isopropyl alcohol, n-butanol, isobutanol, t-butanol, diacetone alcohol, methyl propyl ketone, diethyl ketone, methyl isobutyl ketone, cyclohexanone, diacetone alcohol, dipropyl ether, dibutyl ether, anisole, dioxane, ethylene glycol monoethyl ether, ethylene glycol monobutyl ether, propylene glycol monomethyl ether, propylene glycol monomethyl ether acetate, ethyl acetate, propyl acetate, butyl acetate, and cyclohexyl acetate
   wherein said silicone resin (A) is obtained by using a mixture of (a-1) 1 to 50 Si mol % of a tetraslkoxysilane of the formula wherein m=0 and n=0, or a partial hydrolytic condensate thereof, (a-2) 50 to 99 Si mol % of a trialkoxysilane of the formula wherein m=1 and n=0, or m=0 and n=1, or a partial hydrolytic condensate thereof, and (a-3) 0 to 10 Si mol % of a dialkoxysilane of the formula wherein m=1 and n=1, or a partial hydrolytic condensate thereof, as the alkoxysilane of the formula and/or partial hydrolytic condensate thereof, adding 50 parts to less than 100 parts by weight of water at pH 1 to 7 to 100 parts by weight of the alkoxysilane and/or partial hydrolytic condensate thereof, effecting cohydrolytic condensation to form a silicone resin and an alcohol by-product, and distilling off the alcohol at a liquid temperature of at least 80° C.,
   said silicone resin (A) has a number average molecular weight of 2950 to 50,000 as measured by gel permeation chromatography (GPC), and
   said silicone resin (A) contains units of the formula: $R'SiO_{(3-p)/2}(OX)_p$ derived from component (a-2) wherein R' is $R^1$ or $R^2$, X is hydrogen or $R^3$, $R^1$, $R^2$ and $R^3$ are as defined above, and p is an integer of 0 to 3, in which units of the formula: $R'SiO_{3/2}$ account for 30 to 80 mol %, and the total of units of the formula: $R'SiO_{2/2}(OX)$ and units of the formula: $R'SiO_{1/2}(OX)_2$ accounts for 20 to 70 mol %, as analyzed by silicon nuclear magnetic resonance spectroscopy ($^{29}$Si-NMR).

2. The silicone coating composition of claim 1, wherein $X^-$ in component (B) is a hydroxide anion or acetate anion.

3. The silicone coating composition of claim 1, wherein component (B) is selected from the group consisting of tetrapropylammonium hydroxide, tetrapropylammonium acetate, tetrabutylammoniun hydroxide, tetrabutylammonium acetate, tetrabutylphosphonium hydroxide, tetrabutylphosphonium acetate and mixtures thereof.

4. A coated article comprising
   a substrate and
   a cured coat of the silicone coating composition consisting of:
   (A) a silicone resin resulting from (co)hydrolytic condensation of at least one member selected from an alkoxysilane and a partial hydrolytic condensate thereof, the alkoxysilane having the general formula:

$$(R^1)_m(R^2)_n Si(OR^3)_{4-m-n}$$

wherein $R^1$ and $R^2$ are each independently hydrogen or a substituted or unsubstituted monovalent hydrocarbon group, $R^3$ is alkyl group of 1 to 3 carbon atoms, m and n are each independently 0 or 1, and m+n is 0, 1 or 2,
   (B) an aromatic group-free compound for curing the silicone resin (A), the compound having the general formula:

$$[(R^4)(R^5)(R^6)(R^7)M]^+ \cdot X^-$$

wherein $R^4$, $R^5$, $R^6$ and $R^7$ are each independently an alkyl group of 1 to 18 carbon atoms which may be substituted with halogen, each of $R^4$, $R^5$, $R^6$ and $R^7$ has a Taft-Dubois steric substituent constant Es, the total of constants Es of $R^4$, $R^5$, $R^6$ and $R^7$ is up to −0.5, M is a nitrogen or phosphorus atom, and $X^-$ is a hydroxide anion or carboxylate anion of 1 to 4 carbon atoms, and
   a solvent selected from the group consisting of methanol, ethanol, isopropyl alcohol, n-butanol, isobutanol, t-butanol, diacetone alcohol, methyl propyl ketone, diethyl ketone, methyl isobutyl ketone, cyclohexanone, diacetone alcohol, dipropyl ether, dibutyl ether, anisole, dioxane, ethylene glycol monoethyl ether, ethylene glycol monobutyl ether, propylene glycol monomethyl ether, propylene glycol monomethyl ether acetate, ethyl acetate, propyl acetate, butyl acetate, and cyclohexyl acetate,
   wherein said silicone resin (A) is obtained by using a mixture of (a-1) 1 to 50 Si mol % of a tetraalkoxysilane of the formula wherein m=0 and n=0, or a partial hydrolytic condensate thereof, (a-2) 50 to 99 Si mol % of a trialkoxysilane of the formula wherein m=1 and n=0, or m=0 and n=1 or a partial hydrolytic condensate thereof and (a-3) 0 to 10 Si mol % of a dialkoxysilane of the formula wherein m=1 and n=1, or a partial hydrolytic condensate thereof, as the alkoxysilane of the formula and/or partial hydrolytic condensate thereof, adding 50 parts to less than 100 parts by weight of water at pH 1 to 7 to 100 parts by weight of the alkoxysilane and/or partial hydrolytic condensate thereof, effecting cohydrolytic condensation to form a silicone resin and an alcohol by-product, and distilling off the alcohol at a liquid temperature of at least 80° C.,
   said silicone resin (A) has a number average molecular weight of 2950 to 50,000 as measured by gel permeation chromatography (GPC), and said silicone resin (A) contains units of the formula: R'SiO$_{(3-p)/2}$(OX)$_p$ derived from component (a-2) wherein R' is R$^1$ or R$^2$, X is hydrogen or R$^3$, R$^1$, R$^2$ and R$^3$ are as defined above, and p is integer of 0 to 3, in which units of the formula: R'SiO$_{3/2}$ account for 30 to 80 mol %, and the total of units of the formula: R'SiO$_{2/2}$(OX) and units of the formula: R'SiO$_{1/2}$(OX)$_2$ accounts for 20 to 70 mol %, as analyzed by silicon nuclear magnetic resonance spectroscopy ($^{29}$Si-NMR)

overlying at least one surface of the substrate directly or via at least one layer or different type.

5. The coated article of claim 4, wherein said substrate is an organic resin substrate.

6. A silicone coating composition consisting of:
(A) a silicone resin resulting from (co)hydrolytic condensation of at least one member selected from an alkoxysilane and a partial hydrolytic condensate thereof, the alkoxysilane having the general formula:

$$(R^1)_m(R^2)_n Si(OR^3)_{4-m-n}$$

wherein R$^1$ and R$^2$ are each independently hydrogen or a substituted or unsubstituted monovalent hydrocarbon group, R$^3$ is an alkyl group of 1 to 3 carbon atoms, m and n are each independently 0 or 1, and m+n is 0, 1 or 2, (B) an aromatic group-free compound for curing the silicone resin (A), the compound having the general formula:

$$[(R^4)(R^5)(R^6)(R^7)M]^+ \cdot X^-$$

wherein R$^4$, R$^5$, R$^6$ and R$^7$ are each independently an alkyl group of 1 to 18 carbon atoms which may be substituted with halogen, each of R$^4$, R$^5$, R$^6$ and R$^7$ has a Taft-Dubois steric substituent constant Es, the total of constants Es of R$^4$, R$^5$, R$^6$ and R$^7$ is up to −0.5, M is a nitrogen or phosphorus atom, and X$^-$ is a hydroxide anion or carboxylate anion of 1 to 4 carbon atoms, (C) a solvent selected from the group consisting of methanol, ethanol, isopropyl alcohol, n-butanol, isobutanol, t-butanol, diacetone alcohol, methyl propyl ketone, diethyl ketone, methyl isobutyl ketone, cyclohexanone, diacetone alcohol, dipropyl ether, dibutyl ether, anisole, dioxane, ethylene glycol monoethyl ether, ethylene glycol monobutyl ether, propylene glycol monomethyl ether, propylene glycol monomethyl ether acetate, ethyl acetate, propyl acetate, butyl acetate, and cyclohexyl acetate, and at least one additive selected from the group consisting of microparticulate metal oxides, UV absorbers consisting of derivatives of hydroxyphenone and derivatives of benzotriazole, hindered amine light stabilizers, and flexibilizers, wherein said silicone resin (A) is obtained by a mixture of (a-1) 1 to 50 Si mol % of a tetraalkoxysilane of the formula wherein m=0 and n=0, or a partial hydrolytic condensate thereof, (a-2) 50 to 99 Si mol % of a trialkoxysilane of the formula wherein m=1 and n=0, or m=0 and n=1, or a partial hydrolytic condensate thereof and (a-3) 0 to 10 Si mol % of a dialkoxysilane of the formula wherein m=1 and n=1, or a partial hydrolytic condensate thereof, as the alkoxysilane of the formula and/or partial hydrolytic condensate thereof, adding 50 parts to less than 100 parts by weight of water at pH 1 to 7 to 100 parts by weight of the alkoxysilane and/or partial hydrolytic condensate thereof, effecting cohydrolytic condensation to form a silicone resin and an alcohol by-product, and distilling off the alcohol at a liquid temperature of at least 80° C., said silicone resin (A) has a number average molecular weight of 2,950 to 50,000 as measured by gel permeation chromatography (GPC), and said silicone resin (A) contains units of the formula: R'SiO$_{(3-p)/2}$(OX)$_p$ derived from component (a-2) wherein R' is R$^1$ or R$^2$, X is hydrogen or R$^3$, R$^1$, R$^2$ and R$^3$ are as defined above, and p is an integer of 0 to 3, in which units of the formula: R'SiO$_{3/2}$ account for 30 to 80 mol %, and the total of units of the formula: R'SiO$_{2/2}$(OX) and units of the formula: R'SiO$_{1/2}$(OX)$_2$ accounts for 20 to 70 mol %, as analyzed by silicon nuclear magnetic resonance spectroscopy ($^{29}$Si-NMR).

7. A coated article comprising
a substrate and
a cured coat of the silicone coating composition consisting of:
(A) a silicone resin resulting from (co)hydrolytic condensation of at least one member selected from an alkoxysilane and a partial hydrolytic condensate thereof, the alkoxysilane having the general formula:

$$(R^1)_m(R^2)_n Si(OR^3)_{4-m-n}$$

wherein R$^1$ and R$^2$ are each independently hydrogen or a substituted or unsubstituted monovalent hydrocarbon group, R$^3$ is an alkyl group of 1 to 3 carbon atoms, m and n are each independently 0 or 1 and m+n is 0, 1 or 2, (B) an aromatic group-free compound or curing the silicone resin (A), the compound having the general formula:

$$[(R^4)(R^5)(R^6)(R^7)M]^+ \cdot X^-$$

wherein R$^4$, R$^5$, R$^6$ and R$^7$ are each independently an alkyl group of 1 to 18 carbon atoms which may be substituted with halogen, each of R$^4$, R$^5$, R$^6$ and R$^7$ Taft-Dubois steric substituent constant Es, the total of constants Es of R$^4$, R$^5$, R$^6$ and R is up to −0.5, M is a nitrogen or phosphorus atom, and X$^-$ is a hydroxide anion or carboxylate anion of 1 to 4 carbon atoms, (C) a solvent selected from the group consisting of methanol, ethanol, isopropyl alcohol, n-butanol, isobutanol, t-butanol, diacetone alcohol, methyl propyl ketone, diethyl ketone, methyl isobutyl ketone, cyclohexanone, diacetone alcohol, dipropyl ether, dibutyl ether, anisole, dioxane, ethylene glycol monoethyl ether, ethylene glycol monobutyl ether, propylene glycol monomethyl ether, propylene glycol monomethyl ether acetate, ethyl acetate, propyl acetate, butyl acetate, and cyclohexyl acetate, and at least one additive selected from the group consisting of microparticulate metal oxides, UV absorbers consisting of derivatives of hydroxyphenone and derivatives of benzotriazole, hindered amine light stabilizers, and flexibilizers, wherein said silicone resin (A) is obtained by using a mixture of (a-1) 1 to 50 Si mol % of a tetraalkoxysilane of the formula wherein an m=0 and n=0, or a partial hydrolytic condensate thereof, (a-2) 50 to 99 Si mol % of a trialkoxysilane of the formula wherein m−1 and n=0, or m=0 and n=1, or a partial hydrolytic condensate thereof, and (a-3) 0 to 10 Si mol % of a dialkoxysilane of the formula wherein m=1 and n=1, or a partial hydrolytic condensate thereof, as the alkoxysilane of the formula and/or partial hydrolytic condensate thereof, adding 50 parts to less than 100 parts by weight of water at pH 1 to 7 to 100 parts by weight of the alkoxysilane and/or partial hydrolytic condensate thereof effecting cohydrolytic condensation to form a silicone resin and an alcohol by-product, and distilling off the alcohol at a liquid temperature of at least 80° C., said silicone resin (A) has a number average molecular weight of 2950 to 50,000 as measured by gel permeation chromatography (GPC), and said silicone resin (A) contains units of the formula: R'SiO$_{(3-p)/2}$(OX)$_p$ derived from component (a-2) wherein R' is R$^1$ or R$^2$, X is hydrogen or R$^3$, R$^1$, R$^2$ and R$^3$ are as defined above, and p is an integer of 0 to 3, in which units of the formula: R'SiO$_{3/2}$ account for 30 to 80 mol %, and the total of units of the formula: R'SiO$_{2/2}$(OX) and units of the formula: R'SiO$_{1/2}$(OX)$_2$ accounts for 20 to 70 mol %, as analyzed by silicon nuclear magnetic resonance spectroscopy ($^{29}$Si-NMR) overlying at least one surface of the substrate directly or via at least one layer of different type.

8. A silicone coating composition consisting of:

(A) as the only silicone resin in said composition, a silicone resin resulting from (co)hydrolytic condensation of at least one member selected from an alkoxysilane and a partial hydrolytic condensate thereof, the alkoxysilane having the general formula:

(R$^1$)$_m$(R$^2$)$_n$Si(OR$^3$)$_{4-m-n}$ wherein R$^1$ and R$^2$ are each independently hydrogen or a substituted or unsubstituted monovalent hydrocarbon group, R$^3$ is an alkyl group of 1 to 3 carbon atoms, m and n are each independently 0 or 1 and m+n is 0, 1 or 2, (B) an aromatic group free compound for curing the silicone resin (A), the compound having the general formula:

[(R$^4$)(R$^5$)(R$^6$)(R$^7$)M]$^+$·X$^-$ wherein R$^4$, R$^5$, R$^6$ and R$^7$ are each independently an alkyl group of 1 to 18 carbon atoms which may be substituted with halogen, each of R$^4$, R$^5$, R$^6$ and R$^7$ has a Taft-Dubois steric substituent constant Es, the total of constants Es of R$^4$, R$^5$, R$^6$ and R$^7$ is up to −0.5, M is a nitrogen or phosphorus atom, and X$^-$ is a hydroxide anion or carboxylate anion of 1 to 4 carbon atoms, (C) a solvent selected from the group consisting of methanol, ethanol, isopropyl alcohol, n-butanol, isobutanol, t-butanol, diacetone alcohol, methyl propyl ketone, diethyl ketone, methyl isobutyl ketone, cyclohexanone, diacetone alcohol, dipropyl ether, dibutyl ether, anisole, dioxane, ethylene glycol monoethyl ether, ethylene glycol monobutyl ether, propylene glycol monomethyl ether, propylene glycol monomethyl ether acetate, ethyl acetate, propyl acetate, butyl acetate, and cyclohexyl acetate, and at least one additive selected from the group consisting of microparticulate metal oxides, UV absorbers consisting of derivatives of hydroxyphenone and derivatives of benzotriazole, hindered amine light stabilizers, and flexibilizers, wherein said silicone resin (A) is obtained by using a mixture of (a-1) 1 to 50 Si mol % of a tetraalkoxysilane of the formula wherein m=0 and n=0, or a partial hydrolytic condensate thereof, (a-2) 50 to 99 Si mol % of a trialkoxysilane of the formula wherein m=1 and n=0, or m=0 and n=1, or a partial hydrolytic condensate thereof, and (a-3) 0 to 10 Si mol % of a dialkoxysilane of the formula wherein m=1 and n=1 or a partial hydrolytic condensate thereof, as the alkoxysilane of the formula and/or partial hydrolytic condensate thereof, adding 50 parts to less than 100 parts by weight of water at pH 1 to 7 to 100 parts by weight of the alkoxysilane and/or partial hydrolyltic condensate thereof, effecting cohydrolytic condensation to form a silicone resin and an alcohol byproduct, and distilling off the alcohol at a lquid temperature of at least 80° C., said silicone resin (A) has a number average molecular weight of 2950 to 50,000 as measured by gel permeation chromatography (GPC), and said silicone resin (A) contains units of the formula: R'SiO$_{(3-p)2}$(OX)$_p$ derived from component (a-2) wherein R' is R$^1$ or R$^2$, X is hydrogen or R$^3$, R$^1$, R$^2$ and R$^3$ are as defined above, and p is an integer of 0 to 3, in which units of the formula: R'SiO$_{3/2}$ account for 30 to 80 mol %, and the total of units of the formula: R'SiO$_{2/2}$(OX) and units of the formula: R'SiO$_{1/2}$(OX)$_2$ accounts for 20 to 70 mol %, as analyzed by silicon nuclear magnetic resonance spectroscopy ($^{29}$Si-NMR).

\* \* \* \* \*